US 6,711,672 B1

(12) United States Patent
Agesen

(10) Patent No.: US 6,711,672 B1
(45) Date of Patent: Mar. 23, 2004

(54) METHOD AND SYSTEM FOR IMPLEMENTING SUBROUTINE CALLS AND RETURNS IN BINARY TRANSLATION SUBSYSTEMS OF COMPUTERS

(75) Inventor: Ole Agesen, Needham, MA (US)

(73) Assignee: VMware, Inc., Palo Alto, CA (US)

( * ) Notice: Subject to any disclaimer, the term of this patent is extended or adjusted under 35 U.S.C. 154(b) by 652 days.

(21) Appl. No.: 09/668,091

(22) Filed: Sep. 22, 2000

(51) Int. Cl.$^7$ ............................................... G06F 9/455
(52) U.S. Cl. ....................................... 712/227; 712/242
(58) Field of Search ................................. 712/242, 243, 712/244, 231, 241, 202, 203, 32, 208, 209, 211, 215, 226, 228, 227, 229

(56) References Cited

U.S. PATENT DOCUMENTS

| | | | | |
|---|---|---|---|---|
| 5,038,281 A | * | 8/1991 | Peters | 710/260 |
| 5,574,873 A | * | 11/1996 | Davidian | 712/200 |
| 5,623,617 A | * | 4/1997 | Davidian | 712/227 |
| 5,758,140 A | * | 5/1998 | Kahle et al. | 712/227 |
| 5,847,954 A | * | 12/1998 | Beard et al. | 700/84 |
| 6,049,866 A | * | 4/2000 | Earl | 712/227 |
| 6,470,435 B2 | * | 10/2002 | Samra et al. | 711/202 |
| 6,519,768 B1 | * | 2/2003 | Hughes et al. | 717/159 |

* cited by examiner

Primary Examiner—Henry W. H. Tsai
(74) Attorney, Agent, or Firm—Jeffrey Pearce

(57) ABSTRACT

A sequence of input language (IL) instructions of a guest system is converted, for example by binary translation, into a corresponding sequence of output language (OL) instructions of a host system, which executes the OL instructions. In order to determine the correct return address after any IL call to a subroutine, the corresponding OL return address is stored in an array at a location determined by a hash function. After completion of execution of the OL translation of the IL subroutine, execution is transferred to the address stored in the array at the location where the correct OL return address was previously stored. This location may have been overwritten by some other OL return address. This transfer will therefore be to one of three places: 1) either back to the correct OL call site, in which case execution may continue as normal; 2) directly to a back-up return address recovery module; or 3) to an incorrect OL call site (created upon translation of some other IL subroutine call), in which case execution is transferred to the back-up recovery module. A confirmation instruction block is included in each OL call site to determine whether the transfer was to the correct or incorrect call site.

11 Claims, 4 Drawing Sheets

METHOD AND SYSTEM FOR IMPLEMENTING SUBROUTINE CALLS AND RETURNS IN BINARY TRANSLATION SUB-SYSTEMS OF COMPUTERS

BACKGROUND OF THE INVENTION

1. Field of the Invention

This invention relates to computer programs in general, and in particular, to a method and related system for implementing subroutine calls and returns in the context of binary translation of instructions in an original language into instructions in a target language, which may be the same as the original language.

2. Description of the Related Art

It is a well known fact that software constitutes a large fraction of the cost of computer systems. On the surface, this may seem surprising since, once developed, software can be installed and replicated without limit. The cost, however, stems from the difficulty of initial development, and the need for ongoing maintenance in the form of customization, defect elimination, and development of upgrade versions over the lifetime of the software. To give an indication of the magnitude of software engineering costs, consider that writing what is now considered a medium-sized software package may require hundreds of man-years of investment initially; moreover, following the first deployment, ongoing maintenance may demand comparable resources.

One of the hardest challenges in software engineering, be it initial development or subsequent maintenance, is the management of complexity. In particular, preventing a change or addition to one part of a system from having unforeseen and undesirable consequences in another part of the system can require significant effort. Consider, for example, that a large software system may contain millions of lines of program code, any one of which could potentially interact with any other, and it may be seen that the potential for errors is quite large. This is particularly true since no individual could write all the code, nor could any individual be familiar with all of it, once written. Early on, software developers and researchers recognized that in order to work effectively in such environments where individuals have only partial knowledge of the full system, systematic development techniques must be followed.

Perhaps the most widely employed development technique involves the decomposition of software into subroutines, also known as subprograms, functions, procedures, or methods. A subroutine comprises a number of program statements and optional data structures to perform a given task. The subroutine logically encapsulates the individual statements, allowing them to be invoked ("called") as a group from elsewhere in the program. The effect of the subroutine invocation is to execute the statements encapsulated in the subroutine. When the last such statement completes, execution returns to the point in the program where the subroutine was invoked.

With subroutines, then, instead of solving a top-level problem directly, programmers partition it into a number of smaller problems, such that a solution to the top-level problem can be obtained by combining solutions to the smaller problems: Each smaller problem's solution is encapsulated into a subroutine, enabling the large problem's solution to be expressed as a sequence of subroutine invocations. Often, but not necessarily, the decomposition follows a hierarchical pattern in which higher-level subroutines are implemented in terms of lower-level subroutines, which in turn are implemented from even lower-level subroutines, until the point where the problems have been partitioned sufficiently that solutions can be expressed directly using primitive statements from the programming language.

The use of subroutines provides multiple advantages in software development. First, complexity is reduced locally: The number of logical steps required to solve a given problem can be kept small because the solution can be expressed in terms of higher-level operations implemented in subroutines instead of in terms of the low-level primitives defined directly by the programming language. Second, complexity is reduced globally: Because subroutines encapsulate groups of statements, programmers can often reason about the interaction of subroutines rather than the interaction of individual statements across the program. Without this encapsulation, it would be very difficult to implement large-scale software systems. Third, subroutines allow for code reuse: Once a solution to a sub-problem has been implemented and made available as a subroutine, it can be used as a building block for solving many different problems; this greatly reduces the time required to implement software, since it is not necessary to start from scratch each time. It also reduces the size of programs, since general-purpose subroutines need only be provided once even though they are used in multiple places.

From all of these reasons, and more, the use of subroutines has become fundamental to software engineering. As a result, during execution of programs written in this manner, computers will execute a large number of subroutine calls and returns.

Consider now how subroutines may be implemented on contemporary computers. In other words, consider programming language implementation.

Most of the time, programmers write software in high-level programming languages such as Cobol, Fortran, Modula-2, C, C++, or Java. All of these languages provide subroutines in some form. While the details vary in terms of both syntax and semantics (especially with respect to parameter passing), many similarities remain. In particular, all these languages provide a "last-in, first-out" (LIFO) ordering on subroutine calls and returns: the last subroutine to have been called will be the first one to return. For example, let A, B, and C denote subroutines and suppose that A calls B, and B calls C. If a "return-from-subroutine" statement is executed, it will terminate the execution of subroutine C (the one called most recently) and execution will continue in subroutine B at the point that immediately follows the invocation of C. Later, a return statement in B may terminate B's invocation and take execution back to subroutine A.

Because subroutine execution respects this LIFO order, an efficient implementation can be realized by using a push-down stack. With this well known implementation technique, a subroutine invocation, such as A calling B, is performed in two steps. First, the return address is pushed onto the stack. Second, the program counter is updated to indicate the first statement of subroutine B, that is, execution "jumps" to the beginning of B. The execution of B now proceeds without regard to where it was invoked from. Eventually, a return statement in B will be encountered or, equivalently, the last statement in B will complete. In either case, to return back to its caller, subroutine B need only perform a single step: it pops the top-most item from the stack, which will be the address to which it should return, and places this value in the program counter register. Now, instruction fetching and execution will continue from the point in the caller (A in the example) that follows the call to B.

The use of a stack provides a high degree of generality. A subroutine, such as B, can correctly return back to its caller A, even if B, during its execution, performs further subroutine invocations. For instance, if A calls B, then the stack will contain "A" when the execution of B commences. Now, if B later calls C, then the stack will contain two return addresses "A; B" where B is the most recent (top-most) item. When C returns, it will pop the topmost item from the stack (B) leaving just "A" on the stack. This is the same state as before the call of C in B, so following the invocation and completion of subroutine C, B can execute to completion and return back to A by popping the return address from the stack in the usual manner. (Merely for the sake of notational simplicity, one may equate return addresses with the caller subroutine; in actual implementations, the return addresses must indicate the precise statement within the caller to which execution should return. Often, but not necessarily, this return address will be represented as a memory address.)

The stack implementation of subroutine calls and returns also allows a subroutine to invoke itself. This ability leads to a powerful programming technique known as recursion, and makes possible elegant solutions to a number of problems. During recursive subroutine invocations, the stack will contain a repeated sequence of return addresses " . . . A; A; . . . ; A", but more general patterns involving mutual recursion between two or more different subroutines can also be handled in the stack implementation of calls and returns.

Fundamental to many programming languages and uses of subroutines are the concepts of local state and parameters. Because these concepts are well understood in the art, they will be discussed only briefly here. Most subroutines make use of local variables for carrying out their computations. In many implementations, it is desirable to allocate storage for local variables on the same stack that holds the return addresses. The stack allocation provides two advantages. First, storage is only committed to a subroutine's variables when the subroutine is active. Second, recursive subroutines can have multiple instances of these variables (one per invocation), thereby preventing awkward interference that would result if recursive invocations were to share the local variables. In addition to supporting local variables, subroutine invocation mechanisms will often also provide a mechanism for passing parameters from the caller to the called subroutine. Simplifying slightly, one may think of these parameters as a form of local variables that are initialized by the caller.

It is common to handle all these facets of subroutine invocation by using the concept of activation records (frames). An activation record is a consecutive range of storage on the stack. The activation record contains fields for the return address, the parameters and the local variables. Each subroutine invocation will push one activation record on the stack, and each subroutine return will pop one activation from the stack. Activation records appear and disappear in the same LIFO order as subroutine invocations begin and end.

Without loss of generality, and for the sake of clarity, one may think of and refer to subroutine invocations as pushing and popping simple program counters rather than full activation records. This convention is followed below.

Non-stack-based techniques also exist for implementing subroutine calls, but they have limitations that make them less desirable than the stack approach, except when special circumstances call for their use. In one alternative technique, for example, the caller subroutine writes the return address into a known location that is associated with the called subroutine. The called subroutine then performs a return by setting the program counter to the value found in that known location. Since there is only one such location per subroutine, recursion cannot be supported. In another alternative, subroutine invocations construct a "linked list" of activation records in an object heap. In this case, recursion can be supported, but the costs of heap-allocating and reclaiming the activation records tend to be higher than the costs of using a stack. Unless there are other compelling reasons for using heap allocation, the stack approach is therefore usually considered to be superior.

Because the stack implementation offers significant advantages, it has found widespread use. In turn, and because of this frequent use, most modern CPU's implement direct support for stack-based calls and returns in their machine-code language. These low-level ("hardware") call and return instructions are designed to facilitate translation of high-level programming language subroutine invocations and returns into their low-level counterparts. While the hardware instructions do not implement the full semantics of subroutine invocations as found in many high-level languages and the translation therefore requires the use of additional instructions (for example, for passing parameters), the hardware support for calls and returns nonetheless ensures that subroutine invocations can be implemented very efficiently. Indeed, programmers have come to rely on efficient subroutine mechanisms, thereby completing the feedback cycle from programming style to hardware design and back to programming style.

There are certain situations, however, in which hardware call and return instructions cannot easily, if at all, be used directly to implement subroutine calls and returns. One such situation arises in the context of binary translation.

To understand binary translation, one must distinguish between programs in "source" form, as opposed to "binary" form. The source is the representation that programmers create, modify and extend. Binary programs, on the other hand, result from translation of source into a form optimized for execution. Usually, the binary form is densely encoded and non-textual (from which it derives its name), comprising bit-patterns that represent machine instructions. Besides the textual versus non-textual representation difference, symbolic names in source code may be replaced by absolute memory addresses in binary code, comments found in source code may be absent from binary code, and other information that is inessential for execution may be removed. The process by which binary code is obtained from source code is usually fully automatic and is known as compilation for high-level source languages and assembly for low-level machine code source languages ("assembler languages").

Consider now what would happen if the need were to arise to execute a given program on a platform different from the one for which it was originally developed. There may be several reasons why this could happen, for example, the original platform may no longer be available or economically attractive. Ordinarily, the program would need to be "ported" to the new platform. For programs written directly in the machine code of the original platform, porting may entail an almost complete rewrite of the program since the source program may be intimately tied to the original platform. Thus, the porting effort may be substantial and costly.

The situation is somewhat better for programs written in a high-level language and subsequently compiled into binary form. Often, in this case, the bulk of the source code needs only a few modifications before it can be recompiled for the new platform. On the other hand, recompilation rarely accomplishes 100% of the porting task; several things can get in the way.

Most programs depend on other software, including systems software, for performing basic tasks like file input and output, or application software libraries such as graphical user interfaces. Sometimes, these libraries are unavailable on the new platform and thus require the porting effort to extend beyond the core piece of software. In other cases, parts of the source code for the original application may have been lost, or over time may have become outdated as problems were corrected and extensions added to the software by "patching" the binary program. In yet other cases, no compiler may be available on the new platform for the source programming language. The porting effort, then, must include a source-to-source transformation, the porting of a compiler for the programming language, or a rewrite of the program. Thus, it may be appreciated that in many cases, the costs of porting a program from one platform to another may be substantial, even if secondary effects such as the need to retest and validate the software on the new platform are ignored.

In this situation, binary translation may be an attractive alternative to program-for-program porting. In a binary translation system, a piece of controlling software, namely, the binary translator, is placed between the hardware of the new platform and the binary of the program for the old platform. Stated simply, the binary translator will translate an old-plafform binary program instruction-by-instruction into equivalent instructions for the new platform, in some implementations also interleaving the translation process with the execution of the resulting new-plafform instructions. At the loss of some efficiency due to the binary translation process, this provides the general ability to execute old-plafform binaries in an unmodified (and unported) form on the new platform.

Research prototypes as well as commercially available binary translators have been built for a number of systems, including the FX!32 translator from Compaq/DEC, which allows execution of Intel x86 binaries on an Alpha processor, and the MAE system, which allows execution of Macintosh programs on Solaris/SPARC platforms. Binary translation has also been used to allow older Macintosh 68K programs to execute on newer PowerPC Macintosh computers. Perhaps the most common use of binary translation is found in high-performance Java virtual machines, which translate Java byte-code into instructions that can be executed directly by the underlying hardware. Representative articles describing binary translation include:

"The Design of a Resourcable and Retargetable Binary Translator," Cristina Cifuentes, Mike Van Emmerik, Norman Ramsey, Proceedings of the Sixth Working Conference on Reverse Engineering, Atlanta, USA, October 1999, IEEE-CS Press, pp. 280–291;

"Compiling Java Just in Time," Timothy Cramer, Richard Friedman, Terrence Miller, David Seberger, Robert Wilson, and Mario Wolczko, IEEE Micro, May/June 1997;

"DAISY: Dynamic Compilation for 100% Architectural Compatibility," Kemal Ebcioglu and Erik R. Altman, 24th Annual International Symposium on Computer Architecture Denver, Colorado, June 1997, pp. 26–37; and "Binary Translation," Richard L. Sites, Anton Chernoff, Matthew B. Kirk, Maurice P. Marks, and Scott G. Robinson, Communications of the ACM, 36(2), February 1993.

Binary translation offers valuable capabilities even when employed within a single hardware platform, that is, when the input and output instruction set of the binary translator are identical.

Different binary translators may offer a variety of capabilities and make different assumptions about the input binary programs. For example, one class of binary translators, to which the aforementioned FX!32 and the Java translators belong, assume that the code being translated is at "user level," containing only code that executes in a restricted mode on the CPU and adhering to the (binary) application program interfaces (API's) defined by the combination of the hardware and operating systems of the platform. Other binary translators, such as HP's Dynamo optimizing binary translator, make the further assumption that programs use no reflective operations, ruling out actions such as explicitly accessing or manipulation the return address entries on the stack by means other than performing subroutine invocations and returns.

Essentially, the more assumptions the binary translator makes, the fewer restrictions remain on how the binary program can be transformed in the translation step, allowing for higher performance. In an ideal world, assumptions would be unnecessary, and analysis could extract facts about the program being processed, thereby allowing maximal efficiency within the constraints set by the behavior of each program. The present state of the art in binary code analysis, however, provides only limited capabilities and often incurs considerable analysis costs. Thus, the differentiation between binary translators that make fewer versus more assumptions is justified, at least for the time being.

Binary translators that make no assumptions about the behavior of the translated program may be termed "unrestricted." Such unrestricted translators generally need to fully preserve the illusion that the binary program is executing on the original platform, despite the fact that binary translation is being used. When no assumptions about the behavior of the program are made, this generally requires that the binary translator should faithfully preserve all data structures in memory as they would have appeared, had the program been executing on the original platform.

Consider an unrestricted binary translator that processes a sequence of instructions in an input binary language (IL) generated by a guest system into a corresponding sequence of instructions in the output binary language (OL) of a host system. For example, the IL might be the instruction set specified by the SPARC v9 architecture (see "The SPARC Architecture Manual," David L. Weaver, Tom Germond (Eds.), PTR Prentice Hall, Englewood Cliffs, N.J., 1994), and the OL might be the instruction set specified by the Intel Pentium architecture, commonly referred to as "x86" (see "Pentium Pro Family Developer's Manual," Volume 1–3. Intel Corporation, 1996).

Note that it is also possible for IL and OL to be the same language. For the sake of clarity and to minimize the notational burden, without loss of generality, it is assumed in the following discussion that IL and OL both refer to x86-like languages. While actual computer systems may provide instruction sets that differ in some ways, the semantics used below for IL and OL call and return instructions are representative of almost all modern instruction set architectures (ISA's); those skilled in the art will easily be able to apply the teachings of the various aspect of the invention to any given IL and OL.

Now recall the effect and possible translations of call and return instructions in the IL language. The most common form of call instruction is as follows (text after ";" is a comment):

```
    call P              ;call the subroutine that begins at address P
R:  <some IL instruction> ;instruction following call is at address R
```

When executed, this call instruction will:

1) Push the address R of the following instruction onto the stack.
2) Set the program counter (PC), which on x86 platforms is named %eip, to the address P.

FIG. 1 illustrates the contents of the stack before this call. FIG. 2 illustrates the contents of the stack after execution of the call instruction. Note that, in the x86 instruction set, "%esp" designates the top-of-stack pointer register and that, on the x86, stacks grow from higher toward lower addresses.

In other words, in the x86 ISA, the effect of the call instruction is to push the return address R onto the stack. Now the subroutine at address P executes, possibly making use of the stack to hold temporary data or make further calls, that is, possibly pushing additional items onto the stack (but ordinarily never allowing the top of the stack to recede back over the cell containing "R"). By the time that the subroutine at P has completed and is ready to return, the stack must have returned to the state shown in FIG. 2. To return, the subroutine executes:

```
    ret     ;return to the caller of this subroutine
``` which will pop the topmost element from the stack into the program counter %eip, that is, it will set %eip equal to R and update %esp so that the stack becomes as illustrated in FIG. 3.

An unrestricted binary translator will generally have to translate an IL-call instruction into a sequence of OL-instructions that have the same effect on the stack as the IL-call would have had, had it executed directly on the IL platform. For example, the call may be translated like this:

```
         call P  →  push R
    R:           jmp P'
```

This translation of the call is very efficient: It causes only a minimal slow-down (two OL instructions versus one IL instruction) and faithfully preserves all IL state. In this and the following examples, the arrow denotes translation of an IL instruction into one or more OL instructions. Single quotes (') are used to indicate addresses in the output (translated) domain. In the example above, the subroutine at address P in the IL domain has been translated into OL instructions that are placed at address P'.

In general, unrestricted binary translators must assume that the program being translated may inspect its own code, so the translator places the OL code at a different address than the IL code in order to keep the IL code accessible and unchanged. One way to ensure this is for the binary translator to store the OL instructions in a translation cache located in an area of memory isolated from, for example, beyond the addressable memory limits of, the original program. Moreover, OL-instruction sequences may be longer than IL-sequences, so even if no self-inspection takes place, lack of space may rule out placing OL instructions at the original IL addresses.

Note that to faithfully preserve all state in memory, including the stack, the translated instructions must push the untranslated return address "R" onto the stack: Before returning from the subroutine call, the IL program might execute instructions to inspect the value at the top of the stack. Since this stack location would contain the return address R absent binary translation, it must also contain R even with binary translation.

Consider now the translation of a return. A return has two effects: First, it sets the program counter %eip to the value at the top of the stack and it pops this value by updating the stack pointer so that it points to the next higher (or lower, as the case may be) address on the stack. In other words, %esp:=%esp+1. (Note that in the case of the x86 architecture, in which each word is four bytes long, the actual instruction would be %esp:=%esp+4. Incrementing by one is assumed in this discussion merely for the sake of simplicity. The actual amount by which the stack pointer is incremented (or, equivalently, decremented, depending on the architecture) will of course depend on the architecture for which the invention is implemented.) The second effect (updating %esp) can be easily achieved in the translated domain OL.

Achieving the first effect is, however, harder, because it is necessary to set the machine's program counter to the translated return address R'. But the top of the stack, by the above translation of the call, does not contain R', but rather R. If the system were to set %eip to R, then execution would incorrectly proceed to execute untranslated IL code after the return. The code produced by the translator for returns must therefore map the IL return address found on the top of the stack to an OL return address. This requires a translation of returns of this schematic form:

```
ret  →  save scratch registers %eax, %ebx, %flags
        pop %eax                        ;pop IL return address
        %eax := ILToOLAddress(%eax)
        store (Return_Target), %eax
        restore scratch registers %eax, %ebx, %flags
        jmp (Return_Target)
```

Here, "ILToOLAddress( )" is a place-holder for an OL instruction sequence that maps an IL address to an OL translated address. This instruction sequence can be long. In order to perform the mapping efficiently, one or more registers may be required. Before registers can be used, however, their current contents must be saved to memory so that after the temporary needs of the return translation have been fulfilled, the registers can be restored to the values that the binary program expects. To illustrate, assume that two registers, %eax and %ebx, and the processor status register, %flags, will be used by the return translation sequence. Mathematically, the mapping from IL to OL addresses can be represented as a set of IL/OL address pairs, with the further property that there is at most one OL address associated with any given IL address. To map an IL address to an OL address, the system locates the unique pair whose first component is the IL address in the pair; the sought OL address is then the second component of that pair.

Standard techniques for implementing mappings from one set of values (for example, IL addresses) to another set of values (for example, OL addresses), use data structures such as hash tables, binary trees, or—for small mappings—flat arrays searched linearly. The problem with all these data structures is that even though they are optimized, they are still relatively slow when used in the translation of return instructions: A single IL return instruction is converted into a sequence of OL instructions that, among other things, perform the mapping from IL to OL addresses. Because of this expansion, whereas the original IL return may execute in just a handful of CPU cycles, the OL sequence could require dozens of cycles. Moreover, since subroutine calls and returns are very frequent, the result is a noticeable slowdown when programs execute in a binary translation system.

Other techniques for implementing control-flow changes, including returns, involve variations of a technique known as inline caching, which was first introduced by Deutsch and Shiffman in "Efficient Implementation of the Smalltalk-80 System," Conference Record of the Eleventh Annual ACM Symposium on Principles of Programming Languages, pp. 297–302, Salt Lake City, Utah, 1984. According to these techniques, at the control-flow transfer site (for example, at the site of a translated return), the last translated target to which the transfer went is cached. When sufficient locality exists, such that transfers repeatedly go to the same target (or targets), these inline caches can yield very high performance. Empirical studies have indicated, however, that these techniques are prone to high miss rates when employed for returns, at least for some code. When the miss rates become too high, performance will be dominated by the slower backup strategies that handle misses, which potentially cause more performance to be lost in the "miss" cases than were gained over the conventional solution in the "hit" cases. For example, the inline caches will tend to miss when multiple callers alternate to call a subroutine, because every return would be transferring back to a different target than the previous time.

Yet another prior art technique involves using a second stack separate from the primary stack introduced above. To avoid confusion, one may refer to this second stack as the "shadow" stack. Commonly, shadow stacks have been employed in hardware, where they are often denoted by names like "on-chip" return stacks. In principle, however, they can also be implemented in software, which is the form described here.

A shadow stack is stored in a memory area separate from the primary stack and has its own stack pointer. The shadow stack may be of smaller capacity than the primary stack, in which case it will occasionally be unable to provide assistance when returning. When used in binary translation, the shadow stack is hidden from the program being executed using binary translation. Similarly, in hardware designs, the "on-chip" return stack is often non-architected state, meaning that there are no instructions to manipulate it directly.

Using a shadow stack, one may translate a call into the following schematic sequence:
  push IL return address R on primary stack
  push OL return address R' on shadow stack
  jump to entry point of the translated subroutine
Returns May be Translated to:
  pop IL return address R from the primary stack
  pop OL return address R' from the shadow stack
  verify that the IL and OL items "match", that is, that the R' popped from the shadow stack corresponds to the R popped from the primary stack;
  jump to the OL return address R' obtained in the second step The underlying assumption here is that testing whether IL and OL addresses correspond to each other can be done faster than computing one (OL) from the other (IL). One way to speed up the step of verifying the correspondence between R and R' is to push both R (IL) and R' (OL) onto the shadow stack as a pair. Because stack operations are fast, this is an efficient way to ensure that the "correct" IL/OL pairings are available to the system. The following schematic instruction sequence can be used to accomplish this:
  push IL return address R on primary stack
  push OL return address R' on shadow stack
  push R on the shadow stack
  jump to entry point of the translated subroutine
Returns May be Translated to:
  pop IL return address R from the primary stack
  pop X from the shadow stack
  pop X' from the shadow stack
  verify that X=R and
    if so, then jump to X', which will be the correct R'
    if not, then map the IL address to the correct OL address and jump to the OL address The shadow stack scheme is particularly attractive in hardware because the two push operations in the call sequence and the two pop operations in the return sequence can run in parallel. As a software technique, shadow stacks have certain disadvantages. For example, the cost of pushing items onto the shadow stack (in the call sequence) and popping items from the shadow stack (in the return sequence) can be substantial. It is usually not possible to dedicate a processor register to hold the shadow stack pointer, so this stack pointer frequently will be loaded from memory and saved back to memory. Moreover, boundary checks to prevent shadow stack overflow or underflow may also add costs.

What is needed is a system and a method that enables translation of calls and returns in a manner that a) overcomes the slowness of traditional mappings from IL to OL addresses; b) is less prone than inline caches to high miss rates; and c) permits a more efficient translation of calls than does a software implementation of a shadow stack. This invention accomplishes this.

SUMMARY OF THE INVENTION

According to the invention, subroutine calls and returns are implemented in a computer system by first converting a sequence of input language (IL) instructions of a guest system into a corresponding sequence of output language (OL) instructions of a host system, which executes the OL instructions. Conversion is preferably done by a binary translator. For each call to an IL subroutine made from an IL call site in the IL instruction sequence, a correct IL return address R is stored on a stack. A first hint index is calculated, preferably by evaluating a predetermined hint function with R as an argument, and preferably also as part of the IL-to-OL instruction conversion step. A corresponding correct OL return address R' is stored in a return target cache at a location determined by the first hint index and the OL subroutine translation of the called IL subroutine is executed.

Upon completion of execution of the OL subroutine translation, a current value is retrieved from the stack; a second hint index is calculated by evaluating the hint function with the value retrieved from the stack as the argument; a target address is retrieved from a location in the return target cache determined by the second hint index; and execution is then continued, beginning at the target address.

In the preferred embodiment of the invention, if the target address is not the correct OL return address, then execution is transferred to a back-up return address recovery module, which reconstructs the correct OL return address using a predetermined, secondary address recovery routine.

In the most common case, in which there is a plurality of IL call sites, the system, in particular, the preferred binary translator, translates each IL call site into a corresponding OL call site and inserts a confirmation block of instructions into each OL call site. Whenever any confirmation block of instructions is executed, the value retrieved from the stack is compared with the correct IL return address corresponding to the current OL call site. If the value retrieved from the stack is equal to the correct IL return address, then execution of the OL instructions is continued following the OL call site. If, however, the value retrieved from the stack is not equal to the correct IL return address, then execution is transferred to the back-up return address recovery module.

In the preferred embodiment of the invention, the return target cache is an array that has a plurality of elements. The return target cache is preferably initialized by storing in each element the beginning address of the back-up return address recovery module.

The hint function preferably maps IL return addresses substantially uniformly over the return target cache. A particularly efficient and fast hint function used in the preferred embodiment of the invention forms a bitwise logical AND between bits of the IL return address R and a predetermined constant.

Let equality and inequality between the value retrieved from the stack and the correct IL return address be defined as a "hit" and a "non-hit," respectively. The invention may also include a feature that reduces the likelihood of non-hits by adjusting the size of the return target cache according to a predetermined function of a return success measure, which measures the frequency of occurrence of hits relative to the frequency of occurrence of non-hits.

DETAILED DESCRIPTION

The general idea of the invention is, in the context of binary translation of an IL stream to an OL stream, to provide a way to return very quickly and accurately from a called subroutine. This ability to return accurately works to any level of nesting. This invention applies to all kinds of binary translators, both cross-platform and non-cross-platform binary translators, including the unrestricted binary translators that make no assumptions about the behavior of the translated program. However, while the invention may be applied in the context of any binary translator, it provides the greatest benefits for the unrestricted class of binary translators. As is described at length below, the invention employs a new data structure, referred to below as a "return target cache."

General System Structure

Figure 1:
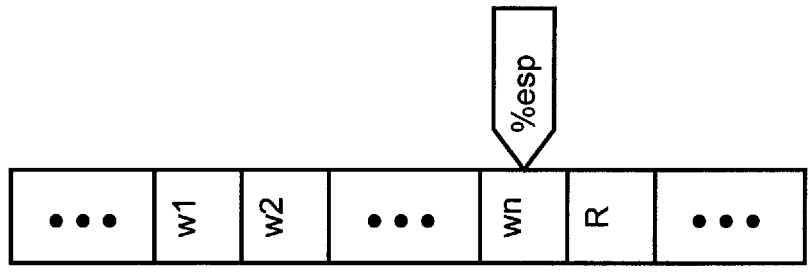
FIGS. 1–3 illustrate the contents of a stack and pointer before a subroutine call, after the call, and after the return from the subroutine.
Figure 2:
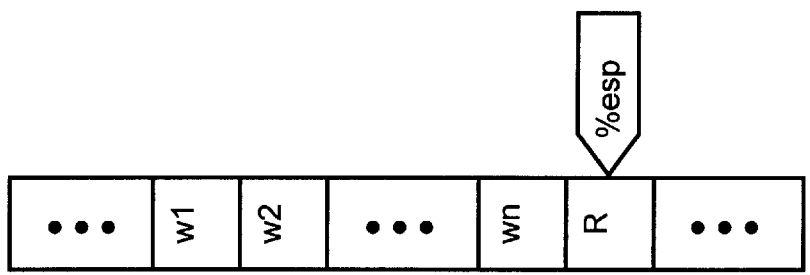
Figure 3:
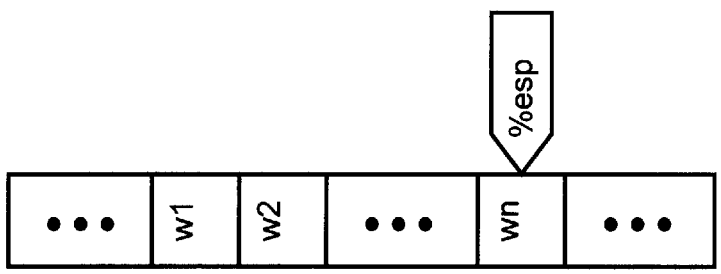
Figure 4:
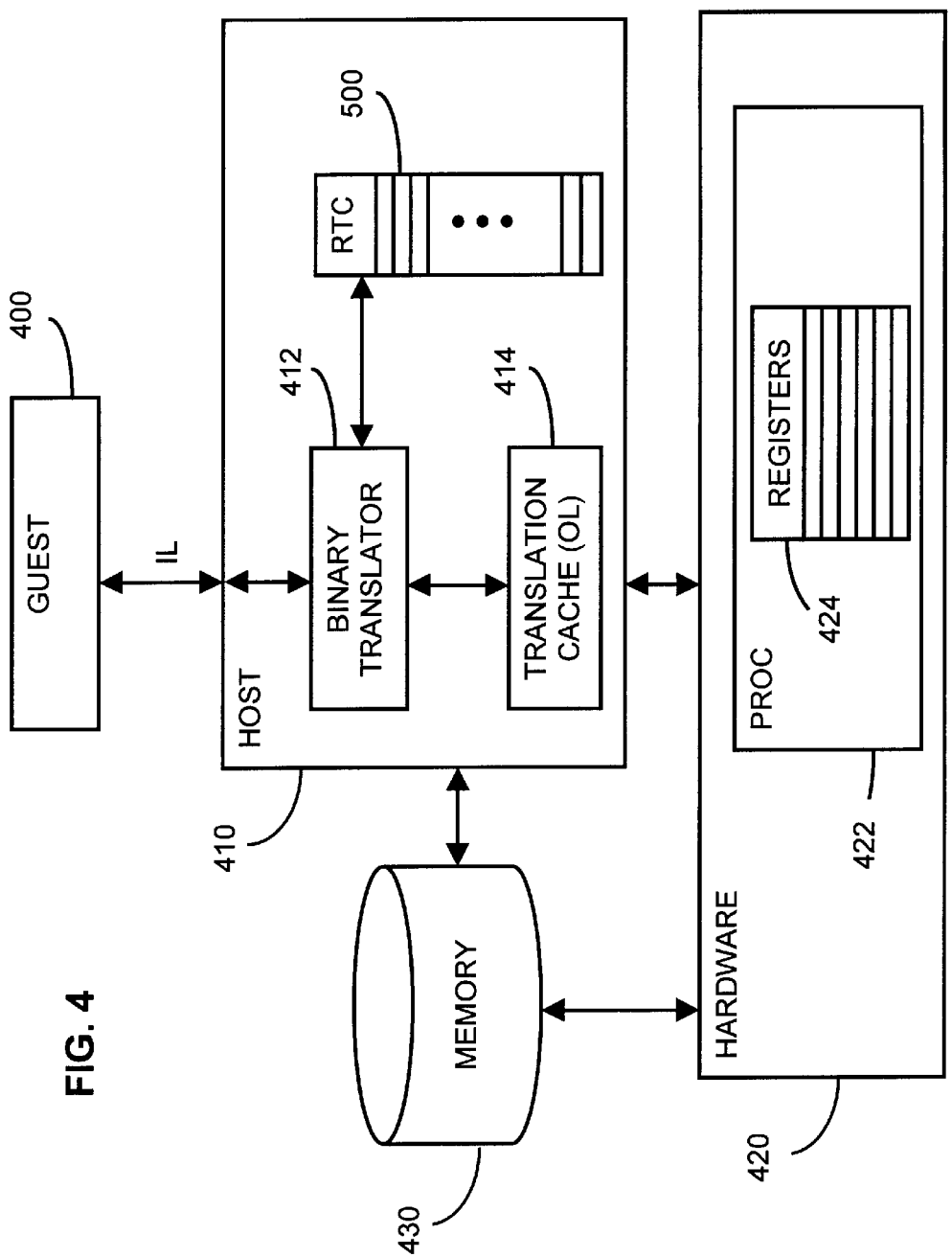
FIG. 4 shows the main hardware and software components of the system according to the invention.

FIG. 4 shows the general structure of a system according to the invention. One or more guest programs or systems 400 (which execute IL instructions) are functionally connected via a host system 410 (which executes OL instructions) to run on an underlying hardware platform 420, which includes a hardware processor 422 and includes various hardware registers 424. (Software registers may also be used, although these will normally be slower.) A conventional memory 430 is included, which may include both volatile and non-volatile storage.

Examples of the many types of guest systems that may use the invention range from a simple, conventional application program to a full-scale virtual machine that includes its own virtual operating system, virtual memory, etc. The guest 400 issues instructions in the input language (IL), whereas it is assumed that the hardware requires instructions in the output language (OL). Note that the input and output languages may actually be the same, or that one may be a subset of the other, but that binary translation between the guest and hardware is used in whole or in part for other reasons, such as to completely virtualize or emulate the guest. In such cases, it may not be necessary to have an actual, physical hardware system at all; rather, the guest may itself be running on a virtual machine or, for example, an emulation of the hardware platform.

The host system 410 includes a binary translator 412, which will typically be a software module, as well as a binary translation cache 414, which stores the output of the binary translator, that is, the IL-to-OL translated instructions. The host system also includes a return target cache 500, which is discussed below. The general design and function of a binary translator and its connected translation cache are well known and are not described in detail below; of course, the specific improvements to the binary translator provided by this invention are.

Actual complete systems will of course contain many other hardware and software components that are well known. These are consequently not illustrated or described here since the invention does not depend on any particular implementation of these components. For example, the host system 410 will include, be connected to, function as, or replace the conventional host operating system found in most modern computers.

Jump to a Subroutine; Return Target Cache

Figure 5:
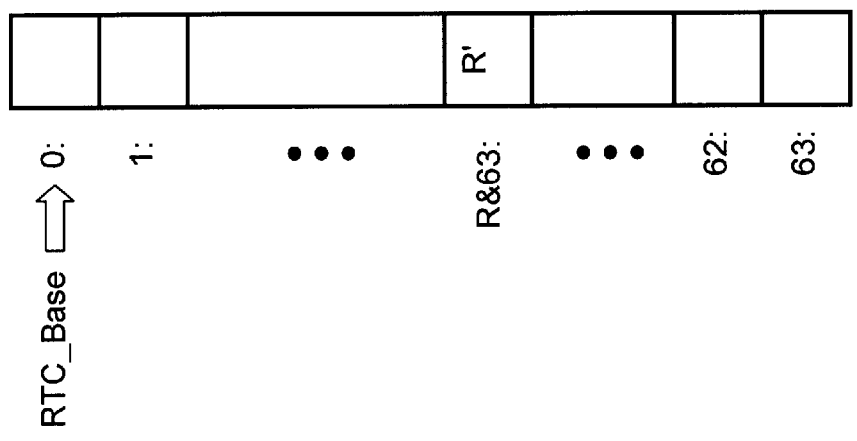
FIGS. 5 and 6 illustrate a return target cache used in the invention, with a return address shown in one cell in FIG. 6.

FIG. 5 illustrates the structure of the return target cache 500, which is preferably implemented as a contiguous and relatively small array in memory. Of course, other data structures may also be used, although such structures will typically slow the invention down, because they will in general require much more bookkeeping and complexity than a simple contiguous array. Moreover, it would also be possible to implement the return target cache using a dedicated hardware memory component, although this will in general also not be necessary, and would reduce the general applicability of the invention.

Similarly, the size of the array may be chosen using normal design and experimental methods. For example, experiments using a prototype of the invention have demonstrated that a 64-element array suffices for most work loads. This structure is therefore assumed below. The elements in the array are OL addresses.

The first step the system according to the invention follows in employing this array is to extend the translation of calls in order to speed up the execution of translated returns. Specifically, the system adds an extra instruction to the OL sequence for calls, which places a return target "hint" in the return target cache. The hint is placed in an array element that is a function RTC_Hash of the untranslated (IL) return address.

Hint_Index:=RTC_Hash(IL return address)

For the sake of a concrete example, and without loss of generality, assume that the return target cache has 64 entries and, as the hash function RTC_Hash, forms the bitwise logical "AND" between the given IL return address and a predetermined constant such as 63. Thus:

Hint_Index:=RTC_Hash(IL return address)=(IL return address) & 63 where "&" denotes bitwise "AND"

Since the binary representation of the decimal constant 63, for any given number of bits in a data word, is 0 . . . 0111111, this example of the hash function RTC_Hash extracts the lower (least significant) six bits of the IL return address. This yields the following translation of an IL call to subroutine P into the corresponding jump to the OL subroutine P':

Jump to Subroutine

| IL | OL |
|---|---|
| call P | → push R |
| R: | store (RTC), R' |
|  | jmp P' |
|  | R': |

Thus, when translating an instruction sequence such as "call", the binary translator converts R to R' and generates code that, during execution, will store R' in the return target cache at the position (RTC)=RTC_Hash(R). This code is followed by a jump to P'.

Figure 6:
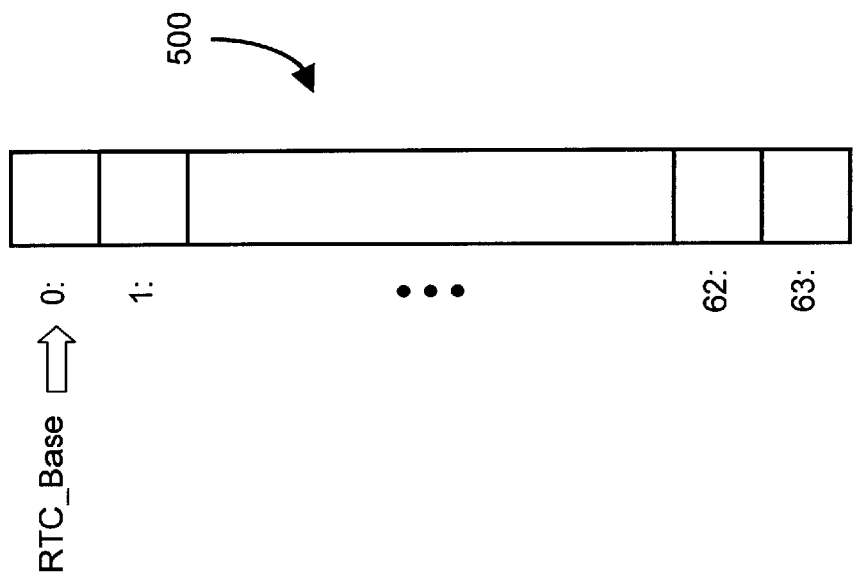

Here, RTC is the address of the cell with index "R & 63" in the return target cache. This address can be computed at translation time by the binary translator and inserted as a literal address in the OL instruction sequence since "R" is a known (constant) value at that time. The effect on the return target cache is illustrated in FIG. 6.

As this example illustrates, the function RTC_Hash maps IL addresses to one of the elements of the return target cache, each of whose elements in turn contains an OL address. The function RTC_Hash may therefore be thought of as a hash function. Any deterministic function may be used to map an untranslated return address to its hint index. The function should preferably be chosen so as to distribute (map) occurring IL addresses uniformly over the return target cache. The reason this is preferable is that it minimizes the likelihood that any two occurring IL addresses will be converted by the mapping function RTC_Hash to the same return target cache location.

If it were known, for example, that in some given input language, the IL addresses were always multiples of two (with the least significant bit always a zero), then simply forming the logical AND with 63 would mean wasting half the return target cache. In such a case, it may be better to select, for example, the six bits starting with the next least most significant bit (in effect, performing a right shift by one bit and then forming (IL & 63)). Those skilled in the art will be able to form appropriate mapping functions that can be rapidly evaluated.

Returning From Subroutine; Launch Code Block

Now consider how a translated return utilizes the "hint" described above. When executing a subroutine (including executing further, nested subroutine calls, which are handled in the same manner as the highest level call), sooner or later the system will reach the ret return instruction corresponding to the call. (Note that if a subroutine fails to include a guaranteed return, then failure to return is a flaw of the original IL subroutine itself and will be faithfully reproduced in the OL sequence.)

When an OL sequence reaches the return point, it then executes a block—the "launch block"—of code (instructions). In this launch block, the system first fetches the IL return address R, which, since it is time to return from the subroutine call, should be at the top of the stack, as described above. Instructions placed by the translator according to the invention into the OL instruction sequence then use R to compute the hint cell address RTC in the same manner as the binary translator did when translating the call. In other words, the OL sequence calculates Hint_index. In this case, however, the computation of RTC takes place dynamically, that is, during execution of the translated sequence. Having computed RTC, the OL sequence loads the contents (R') of this cell, and sets %eip to this value (i.e., jump to R'), thereby accomplishing the return.

By way of example, the launch block that would be executed whenever a return instruction is encountered, expressed in x86 instructions, would be as follows:

Launch Block

| IL | OL | |
|---|---|---|
| ret | → save scratch registers %eax, %ebx, %flags | |
|  | pop %eax | ; pop IL return address R |
|  | mov %ebx, %eax | ; copy R to %ebx |
|  | and %ebx, 63 | ; %ebx = R & 63 (hash function) |
|  | jmp (RTC_Base + %ebx) | ; jump to hinted target |

Now Consider Each Instruction of this Return Sequence in Turn:

save scratch registers %eax, %ebx, %flags

This code in the OL return sequence saves the scratch registers so that they can be used for performing the return. More specifically, because the return and "back-up" (the Miss/Failure handler described below) routines in this illustrative implementation use the registers %eax and %ebx, and may change the flags, the system needs to save these beforehand in order to be able to restore them, and thus restore the complete system state upon return.

pop %eax

This instruction fetches the information at the top of the stack into %eax. Unless the code after the original subroutine call in some way modified this information (for example, by some stack manipulation operations—see below) then the top of the stack should contain the IL return address R. The system then automatically (as part of execution of the pop instruction) also updates the stack pointer. At this point, barring deliberate previous modification of the stack other than by push and pop instructions, the "pop %eax" instruction will place the untranslated return address R into %eax.

mov %ebx, %eax

This instruction places yet another copy of R into the register %ebx. Note that it is generally faster to copy from one register (%eax) to another than from a memory location to a register.

and %ebx, 63

This instruction implements the function RTC_Hash described above, and leaves in register %ebx the value equal to the bitwise logical AND of its previous contents (here, R) and the hash constant (here, 63). This also shows one of the advantages of choosing as the hash function RTC_Hash the straightforward, logical AND with a constant: It can be calculated very fast, because it needs only a single instruction that uses few clock cycles to execute.

jmp (RTC_Base+%ebx)

Here, RTC_Base is the address that identifies the beginning of the return target cache, that its, the address of word 0 shown in FIGS. 4 and 5. As with the stack, %ebx is here "scaled" by a factor of four, or by whatever word size (in bytes or other units) that may be used in a given architecture. The instruction as a whole performs a memory-indirect jump through the return target cache's hint cell for the IL address R. In other words, execution is transferred to the address X stored in the cell of the return target cache located %ebx positions from the beginning. Thus, if %ebx is 62, then the address found in the return target cache at index 62 is the basis of the memory-indirect jump.

Confirmation Code Block

Upon completed execution of the launch block, the following will apply:

%eax will contain the value found at the top of the stack;
%ebx will be RTC_Hash(%eax)
the next instruction to be executed is at the address X, which is stored in the return target cache at the location with the index (RTC_Base+%ebx)

The binary translator according to the invention inserts a block of code (instructions)—the "confirmation block"—preferably beginning at each return destination (here: R') in the OL instruction stream. This confirmation block determines whether the return address that was found at the hint and that was used for the return is in fact correct, that is, whether execution has returned to the right place in the OL instruction stream.

A complete sequence for calls and returns, expressed as before in x86 instructions, for the confirmation block is:

Confirmation Block

| IL | OL | |
|---|---|---|
| call P | → push R | ; push IL return addres |
| R: | store (RTC), R' | ; set return target cache hint |
| | jmp P' | ; jump to translated routine |
| R': | cmp %eax, R | ; return to right place? |
| | jne Miss/Failure | ; jump to "back-up" code if wrong |
| | restore %eax, %ebx, %eflags | |
| | . . . continue in translated code . . . | |

The various parts of this sequence are explained in detail below. Here, as is well known, "cmp" and "jne" are the x86 instructions for "compare" and "jump if not equal"; the other instructions are immediately obvious to those skilled in the art.

The first three instructions in the translated (OL) sequence for calls were explained above, and are those that prepare for and carry out the actual transfer to the subroutine. These instructions are repeated here only as a reminder and to keep clear the relationship between R and R'—there is no need for these instructions to be co-located with the following instructions, which are described below, and which form the confirmation block proper. As is pointed out above, the third instruction (jmp P') jumps to the translated subroutine (P') so that, after the jmp P' instruction, the processing system executes the subroutine P' in translated form.

Eventually, the system will (barring a very unusual or faulty IL sequence) reach a translated return instruction. The rest of the code shown at the call site will execute after the return, because this portion of the code begins at address R'; this code thus performs the actual analysis of return addresses either to confirm that the return address used was correct, or to direct the system to the Miss/Failure handler described below.

Consider now each of the instructions of the confirmation block separately.

cmp %eax, R

When execution reaches this point (R'), the system must determine whether the address to which it has just performed the memory-indirect jump using the value X in the return target cache actually corresponds to the return address R for the original subroutine call. The cmp %eax, R instruction therefore sets a "condition met" flag (or other analogous indicator) if the two values are equal, but not if they are unequal.

jne Miss/Failure

If the preceding comparison succeeded, then this instruction causes no jump, and execution continues to the immediately following instruction, that is, to restore %eax, %ebx, %eflags.

restore %eax, %ebx, %eflags

In order to restore the system to the state it was in immediately before the call to the subroutine, the scratch registers and flags must be restored. These instructions (the restore operation involves several instructions) accomplish this, and after their execution the subroutine call is completely and successfully "finished." Execution may then proceed to the next translated code in the translation cache.

Hit

In most cases, execution of the launch block of instructions returns execution to the correct translated return address R', that is, (RTC_Base +%ebx)=X=R', which is the address of the correct return point in the OL instruction sequence after the original OL call to the subroutine P'. %eax—the data popped from the stack—will be the same as the IL return address R. The cmp %eax, R in the confirmation block will therefore produce a "condition met" value (set the corresponding flag to the value indicating equality of the terms %eax, R), so that the following instruction jne Miss/Failure will not cause a jump. Execution therefore continues to the immediately following instruction, that is, to restore %eax, %ebx, %eflags, and further to the next translated code in the translation cache.

This case is a "hit," that is, a successful, accurate return to the intended reentry point into the original OL instruction stream. Because of the return target cache and the nature of the mapping function RTC_Hash, a hit will be by far the most common case in the great majority of implementations of the invention. In this case, execution may simply continue from R' as normal, with no further involvement of the special mechanisms provides by this invention, until the next subroutine call or return is encountered.

Miss

It is possible, however, that the correct hint return address R' may have been overwritten by another call/return pair that executed inside the routine P. For example, within the instruction sequence P may be yet another (or even many) additional calls to other subroutines, for example, Q, each causing calculation of a hint return address. The hash function RTC_Hash might then map one or more of these "nested" return addresses to the same location in the return target cache as the higher-level return address R. Upon return, execution will then transfer to the beginning of the confirmation block for some OL call sequence, but one that is incorrect. This case is referred to as a "miss."

To take a specific example, given the 64-element return target cache and the function RTC_Hash:=(IL return address) & 63, then the IL return addresses 184 (binary: 00 . . . 010111000) and 120 (binary: 00 . . . 01 111000) would map to the same hint location of 56, since their six least significant bits 111000 are the same. Of course, in the x86 architecture, addresses consist of 32-bit data words; the addresses 120 and 184 are merely simple examples, although the procedures described below will work with any addresses.

More generally, let PR and PR' be the IL and OL return addresses, respectively, for a call to subroutine P and let QR and QR' be the IL and OL return addresses, respectively for a call to subroutine Q. Whenever P is called from a call site, PR will be pushed onto the stack; similarly, whenever Q is called from this call site, QR is pushed onto the stack. If, however, P calls Q and QR maps to the same location in the return target cache as PR, then upon return to the original call site, execution will transfer to QR', since this value will have overwritten QP' in the return target cache. In such a case, the return sequence would be directed to the wrong destination (QR').

In the case of a miss, %eax will therefore not be the same as the IL return address of the calling code. In other words, to continue with the two-subroutine example just given, %eax will contain PR, but the cmp instruction at the current location will be cmp %eax, QR; the comparison in this confirmation block will therefore fail. The next instruction—jne Miss/Failure—then causes a jump to the Miss/Failure handler (described below).

Miss/Failure Handler

The "back-up" code, referred to here as the Miss/Failure handler, is the routine according to the invention that handles the cases in which the system determines that the correct return address has been overwritten or that the currently assumed return address is otherwise incorrect (see below). In other words, it is the set of instructions that the system executes in order to determine the correct return point when the fast and simple calculation of the hash function RTC_Hash gives a return address the system determines is incorrect.

The Miss/Failure routine may be any conventional method that maps the IL return address to an OL return address. (Recall that the IL return address is still available in %eax when the jne Miss/Failure instruction invokes this routine.) For this "back-up" mapping, it can use any of several well-known data structures such as a conventional hash table. Since the back-up routine, that is, the Miss/Failure handler executes only when the return target cache misses or fails (see below)—events which are relatively rare—even a costly hash table lookup may be used to perform the return. The back-up code will thus use this conventional hash table to compute the correct OL return target, restore the scratch registers and flags, and finish with a jump to the correct OL return target. In other words, the slow, back-up procedure used in this invention is the same as the only return procedure found in prior art systems—most of the time, however, the invention is able to use the return target cache and the much faster return procedure described above.

In very rare cases, it is possible that even a conventional hash table will not determine the correct return address. This problem is of course encountered in the prior art systems that use the hash table-based return scheme. If this happens, it may be because there is no known OL return address that corresponds to the current value of %eax—there is no way "back." In this case, as in prior art systems, the system according to the invention may simply perform a callout to the binary translator and cause it to translate the code starting at %eax and onwards until some predetermined criterion is met. This criterion might be, for example, that it reaches a jump (jmp) or some other known translation, or simply that it has translated some fixed, predetermined number of instructions.

Failure

One other return "error" is also possible, that is, one case in which execution could be returned from a subroutine to an improper address: When a return instruction ret is encountered (at the end of a translated subroutine), it is possible that the top of the stack no longer contains the proper IL return address. This could happen, for example, if the subroutine whose execution has just completed and from which the system is to return deliberately or accidentally manipulated the stack, such as may occur within certain reflective code, or because of a "bug." As such, when the pop %eax of the return sequence is executed, the word popped from the stack will not be the correct return address R; indeed, it will probably not be a return address at all. This situation is referred to here as a "failure."

In order to avoid an attempt by the system to return to an undefined "address" and to branch to some undefined point in memory, the return target cache is therefore preferably initialized by putting into each of the 64 RTC array elements a default value, specifically, the address to the beginning of the Miss/Failure handler. This initialization should also be done any other time the entries in the return target cache are invalidated. For example, certain events, such as address space mapping changes in a system-level binary translator, may require invalidation of the entries in the return target cache. Filling the return target cache with the default address of the Miss/Failure handler will cause the next few translated returns to execute the back-up sequence, but soon the return target cache will be filled with useful entries again, and execution will proceed at the faster speed provided by cache hits, that is, correct returns from the return target cache.

Assume again that the IL instruction sequence includes a call to a subroutine P, with an IL return address of PR, and also a call (which may be within P) to at least some other subroutine Q, with an IL return address of QR. The corresponding OL subroutines and return addresses are thus P', PR', Q' and QR'. To summarize the discussion above, after completed call to P (P'), the memory indirect jump jmp (RTC_Base+%ebx) of the return sequence is executed, and there will be only the following three possible actions:

1) a return to the correct beginning address PR' of the confirmation sequence following the correct subroutine call, in short, a "successful," correct return—a "hit";
2) a return to the beginning address QR' of the confirmation sequence of the wrong subroutine—a "miss"—which will have happened because a later IL return address QR was converted by the hash function RTC_Hash to the same the position in the return target cache and thus overwrote the correct (that is, earlier) entry PR'. This can also happen if the IL program changed the return address on the stack. In this case, the confirmation sequence will direct execution to the Miss/Failure handler; or
3) a jump directly to the Miss/Failure handler in the case that the entry in the return target cache contains the initial, default address, which indicates a failure. Note that any other entry besides the default value will be the address to the beginning of the confirmation sequence of some translated subroutine, since the only time a non-default entry is stored in the return target cache is when the binary translator has translated an IL subroutine and has generated code that puts its translated return address into the return target cache.

Figure 7:
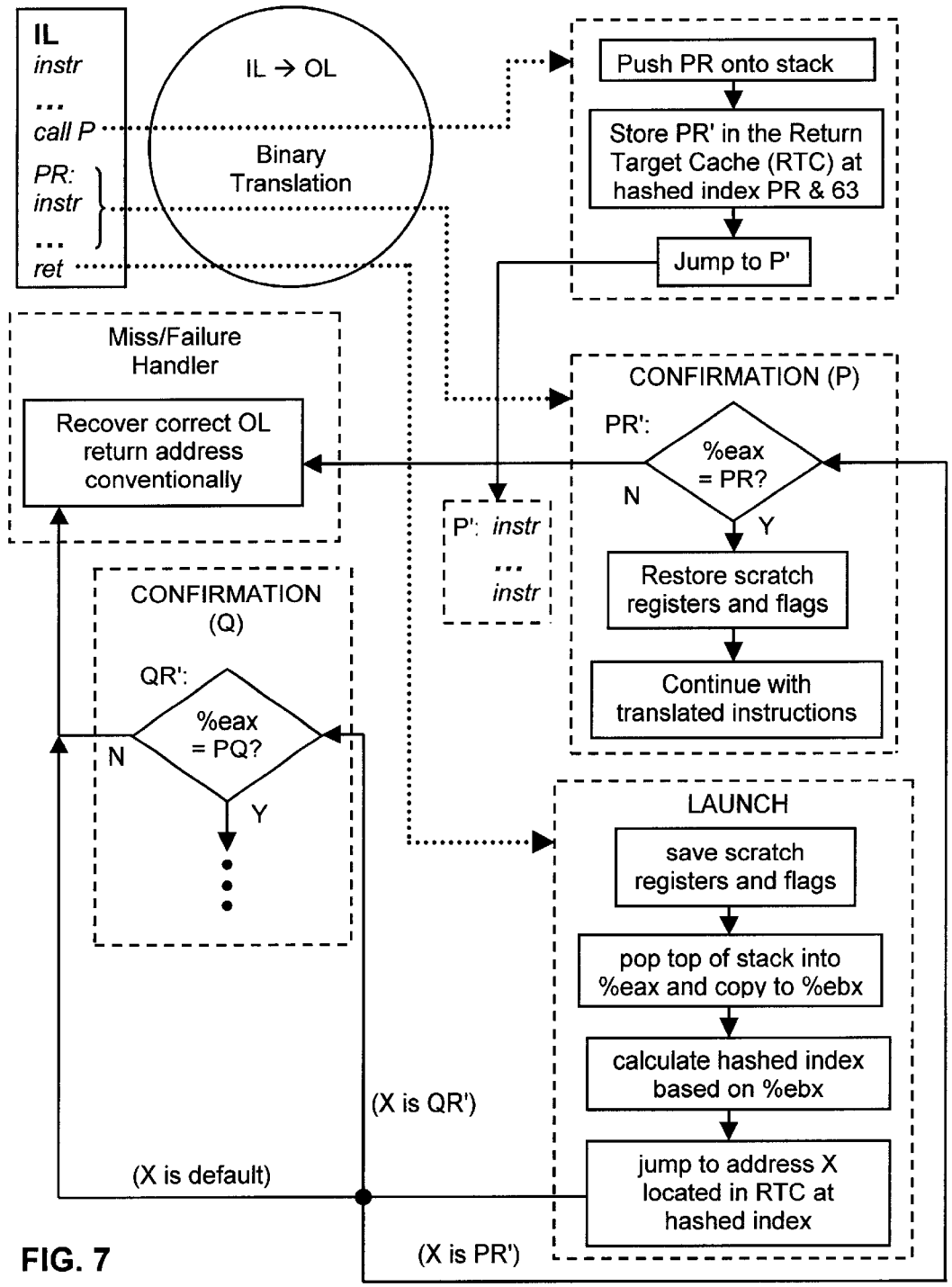
FIG. 7 is a flowchart that shows the main processing steps carried out according to the invention in order to quickly and accurately branch to and return from subroutines.

FIG. 7 is a flowchart that illustrates the binary translation of the IL instruction sequence into the OL sequence, which is stored in the binary translation cache. In FIG. 7, the IL instruction sequence is shown within a box with a solid border; all other instruction blocks are in the OL sequence. Arbitrary IL instructions, and their OL translations, are shown simply as instr. FIG. 7 also illustrates the three possibilities for returning after completion of a call to the subroutine P'.

The reason why the return target cache achieves a high hit rate is that at any given time, it will tend to contain return target hints for the most recently executed calls. These are the calls that are likely to return in the near future. In other words, the return target cache exploits a locality phenomenon: the depth fluctuations on the return stack as calls and returns execute are relatively modest in most programs. This allows a small return target cache to capture the active calls and returns with a high probability.

Above is described the preferred embodiment of the invention, for using the return target cache upon translation of calls and returns. There are, however, alternatives. For example, in one variation, the code—the confirmation sequence—shown above at the translated call site to confirm the correctness of the hint may be moved to the return site. This would necessitate slight changes. Specifically, the cmp %eax, R instruction that compares the actual (IL) return address with the one expected at the site that the return target cache points to, would need to be changed into a memory-indirect comparison. More precisely, the return code would load the return target cache hint into a register, say %ebx. Then it would compare %eax with the contents at address "%ebx—delta", where delta is the distance from R' to the immediate operand in the "push R" instruction. Thus:

cmp %eax, delta(%ebx)

This comparison determines if %eax, the actual return address, matches the immediate operand of the "push" instruction at the call site that the hint indicates the system should jump to.

Other variations might involve reorganizing the return code to enable multiple return sites to share some of the code. This would provide a code space savings, but would not change the fundamental idea of the invention. The method according to the invention may also be generalized to handle other forms of returns, such as far returns and returns with immediate operands; necessary changes to the steps described above will be obvious to those skilled in the art. In all cases, though, note that the binary translator according to the invention is able to handle the conversion and checking of return addresses dynamically.

Dynamic RTC Array Adjustment

One factor that affects the efficiency of the system according to the invention is the frequency of misses, since it takes a relatively long time to determine the correct OL return address in the Miss/Failure handler. A high miss rate might arise, for example, because of an IL program with many deeply nested subroutines.

The system according to the invention may therefore also include a mechanism that dynamically adapts the size of the RTC to current needs. Using this adaptation mechanism, if the miss rate exceeds some experimentally or arbitrarily determined expansion threshold, then the system will often be able to reduce the likelihood of misses by increasing the size of the RTC. In addition to increasing the memory allocation for the RTC array, the hash function RTC_Hash should then be adjusted accordingly. For example, if the array is increased from 64 to 128 elements, then the "hashing constant" of RTC_Hash should also be changed from 63 to 127 in order to extract the seven least significant bits of the IL return address instead of only six.

When the miss rate falls below a contraction threshold (which may be the same as the expansion threshold), the RTC array may then be made smaller. Such contraction may not be necessary, however, since the array will seldom take up much space; instead it can be returned to its initial, default size when the binary translator begins translating a different IL instruction sequence.

Of course, the problem is how to calculate the miss rate. One way is to include incrementing instructions in the Miss/Failure handler to count misses. The miss rate can then be defined as the number of misses that have occurred during some predetermined interval. One problem with this approach, however, is that a very high rate of subroutine calls might lead to a high miss count, even though the ratio of misses to total calls is acceptable.

It would therefore be better to adjust the RTC size based on the relative frequency of misses (for example, the ratio of misses to total calls, or the ratio of misses to hits) rather than on the absolute number of misses in a given interval. In doing so, one should avoid including any additional instructions in the confirmation blocks, because these blocks will usually be executed so often that the time needed to execute the additional instructions will in almost all cases be more than the time saved by implementing the dynamic RTC array adjustment feature.

One way to determine the relative miss rate, and to adjust the RTC size accordingly, is to use a sampling technique. First, note that the system can determine, for any given value of the instruction pointer, whether execution is currently in the launch block, in a confirmation block, or in the Miss/Failure handler. A module can therefore be included within the binary translator, or elsewhere in the host system, to periodically interrupt execution of the OL instructions and determine whether execution is in a confirmation block (indicating a hit or miss), in the Miss/Failure handler (indicating a miss or failure) and/or in the launch block (indicating some return). Let M be the number of times execution is found to be in the Miss/Failure handler; C be the number of times execution is found to be in a confirmation block; and L be the number of times execution is found to be in the launch block. The ratio M/C will then be a reasonable estimate of the ratio of misses to total non-failure returns. (Note that adjusting the size of the RTC array will usually not affect the rate of failures.) Similarly, M/L will be a reasonable estimate of the ratio of misses to total returns, including failures. Either M/C or M/L can therefore be used as the miss rate and compared with the expansion and contraction thresholds.

What is claimed is:

1. A method for implementing subroutine calls and returns in a computer system comprising the following steps:

A) converting a sequence of input language (IL) instructions of a guest system into a corresponding sequence of output language (OL) instructions of a host system;

B) executing the OL instructions in the host system;

C) for each call to an IL subroutine made from an IL call site in the IL instruction sequence:

i) storing a correct IL return address R on a stack;

ii) calculating a first hint index by evaluating a predetermined hint function with R as an argument;

iii) storing a corresponding correct OL return address R' in a return target cache at a location determined by the first hint index;

iv) executing an OL subroutine translation of the called IL subroutine;

D) upon completion of execution of the OL subroutine translation:

i) retrieving a current value from the stack;

ii) calculating a second hint index by evaluating the hint function with the value retrieved from the stack as the argument;

iii) retrieving a target address from a location in the return target cache determined by the second hint index; and iv) continuing execution beginning at the target address.

2. A method as in claim 1, further including the following steps:

if the target address is not the correct OL return address, transferring execution to a back-up return address recovery module; and in the back-up return address recovery module, reconstructing the correct OL return address using a predetermined, secondary address recovery routine.

3. A method as in claim 2, in which there is a plurality of IL call sites, further including the following steps:

translating each IL call site into a corresponding OL call site;

inserting a confirmation block of instructions into each OL call site;

upon execution of any confirmation block of instructions:
comparing the value retrieved from the stack with the correct IL return address corresponding to the current OL call site;
if the value retrieved from the stack is equal to the correct IL return address, continuing execution of the OL instructions following the OL call site; and
if the value retrieved from the stack is not equal to the correct IL return address, transferring execution to the back-up return address recovery module.

4. A method as in claim 2, in which the return target cache is an array having a plurality of elements, further including the step of initializing the return target cache by storing in each element a beginning address of the back-up return address recovery module.

5. A method as in claim 1, in which:

the return target cache is an array having a plurality of elements; and the hint function maps IL return addresses substantially uniformly over the return target cache.

6. A method as in claim 5, in which:

each of the elements of the return target cache is identified by an array index; and the hint function forms a bitwise logical AND between bits of the IL return address R and a predetermined constant.

7. A method as in claim 1, in which:

the return target cache is an array having a plurality of elements;

the hint function maps IL return addresses substantially uniformly over the return target cache;

equality and inequality between the value retrieved from the stack and the correct IL return address are defined as a hit and a non-hit, respectively;

further including the following steps:
calculating a return success measure as a predetermined function of the frequency of occurrence of hits relative to the frequency of occurrence of non-hits;
adjusting the number of elements in the return target cache according to a predetermined function of the return success measure.

8. A method as in claim 1, in which the step of calculating the first hint index is performed as part of the step of converting the sequence of IL instructions into the corresponding sequence of OL instructions.

9. A method for implementing subroutine calls and returns in a computer system comprising the following steps:

A) converting a sequence of input language (IL) instructions of a guest system into a corresponding sequence of output language (OL) instructions of a host system;

B) executing the OL instructions in the host system;

C) for each call to an IL subroutine made from any of a plurality of IL call sites in the IL instruction sequence:
i) storing a correct IL return address R on a stack;
ii) calculating a first hint index by evaluating a predetermined hint function with R as an argument;
iii) storing a corresponding correct OL return address R' in a return target cache at a location determined by the first hint index, the return target cache comprising an array of elements;
iv) executing an OL subroutine translation of the called IL subroutine;

D) upon completion of execution of the OL subroutine translation:
i) retrieving a current value from the stack;
ii) calculating a second hint index by evaluating the hint function with the value retrieved from the stack as the argument;
iii) retrieving a target address from a location in the return target cache determined by the second hint index; and
iv) continuing execution beginning at the target address;

E) if the target address is not the correct OL return address, transferring execution to a back-up return address recovery module;

F) in the back-up return address recovery module, reconstructing the correct OL return address using a predetermined, secondary address recovery routine;

G) translating each IL call site into a corresponding OL call site;

H) inserting a confirmation block of instructions into each OL call site and, upon execution of any confirmation block of instructions:
i) comparing the value retrieved from the stack with the correct IL return address corresponding to the current OL call site;
ii) if the value retrieved from the stack is equal to the correct IL return address, continuing execution of the OL instructions following the OL call site; and
iii) if the value retrieved from the stack is not equal to the correct IL return address, transferring execution to the back-up return address recovery module.

10. A system for implementing subroutine calls and returns in a computer system comprising:

A) a host computer system that executes host instructions in an output language OL;

B) a guest system that is operatively connected to the host system;

C) a binary translator converting a sequence of input language (IL) instructions of the guest system into a corresponding sequence of the output language (OL) instructions of the host system and storing the OL instructions in a translation cache, D) the binary translator forming means for inserting a call block and a launch block into the sequence of OL instructions, E) the call block, upon each call to an IL subroutine from an IL call site in the IL instruction sequence forming means i) for storing a correct IL return address R on a stack;
ii) for determining a first hint index by evaluating a predetermined hint function with R as an argument; and
iii) for storing a corresponding correct OL return address R' in a return target cache at a location determined by the hint index;
iv) for transferring execution to the OL subroutine translation of the called IL subroutine;

F) the launch block, upon completion of execution of the OL subroutine translation, forming means
i) for retrieving a current value from the stack;
ii) for calculating a second hint index by evaluating the hint function with the value retrieved from the stack as the argument;
iii) for retrieving a target address from a location in the return target cache determined by the second hint index; and
iv) for continuing execution beginning at the target address.

11. A system as in claim 10, in which:

there is a plurality of IL call sites;

the binary translator further forms means
for translating each IL call site into a corresponding OL call site;
for inserting a confirmation block of instructions into each OL call site;
for comparing the value retrieved from the stack with the correct IL return address corresponding to the current OL call site;
for continuing execution of the OL instructions following the OL call site if value retrieved from the stack the is equal to the correct IL return address; and for transferring execution to the back-up return address recovery module if the value retrieved from the stack is not equal to the correct IL return address.

* * * * *